United States Patent [19]

Saga

[11] Patent Number: 4,703,544

[45] Date of Patent: Nov. 3, 1987

[54] METHOD OF MANUFACTURING A ROTOR FOR HYDRAULIC ROTARY VALVE

[75] Inventor: Hiromu Saga, Matsuyama, Japan

[73] Assignee: Jidosha Kiki Co., Ltd., Tokyo, Japan

[21] Appl. No.: 898,168

[22] Filed: Aug. 19, 1986

[30] Foreign Application Priority Data

Aug. 29, 1985 [JP] Japan .............................. 60-190392

[51] Int. Cl.⁴ ...................... B21D 53/00; B21D 53/10
[52] U.S. Cl. .................................. 29/157.1 R; 72/402; 72/416
[58] Field of Search ............ 29/157.1 R, 157 R, 33 T, 29/33 R, 148.4 C, 557, 558; 72/402, 416

[56] References Cited

U.S. PATENT DOCUMENTS 3,591,136  7/1971  Bishop .............................. 251/209
4,103,407  8/1978  Elizalde et al. ................ 29/157.1 R
4,442,579  4/1984  Millard ........................... 29/157.1 R Primary Examiner—Howard N. Goldberg
Assistant Examiner—Ronald S. Wallace
Attorney, Agent, or Firm—Flynn, Thiel, Boutell & Tanis

[57] ABSTRACT

A method of manufacturing a valve rotor is disclosed which forms a hydraulic rotary valve as may be used in a power steering apparatus. A valve rotor includes axially extending grooves formed in its peripheral surface. Each groove is provided with chamfered portions. Each chamfered portion is formed with a first surface which continues to the sidewall of a groove and disposed at an angle with respect to the sidewall, and a second surface which joins the first surface with the arcuate peripheral surface of the rotor. The both surfaces are simultaneously molded by a plastic working.

6 Claims, 4 Drawing Figures

METHOD OF MANUFACTURING A ROTOR FOR HYDRAULIC ROTARY VALVE

FIELD OF THE INVENTION

The invention relates to a method of manufacturing a rotor for hydraulic rotary valve which may be employed in a power steering apparatus or the like.

BACKGROUND OF THE INVENTION

A hydraulic rotary valve as used in a power steering apparatus comprises a valve rotor having a plurality of axial grooves formed therein, and a valve sleeve which is rotatably fitted around the valve rotor and having axial grooves, which are disposed in overlapping relationship with the opposite circumferential sides of a groove formed in the internal surface of the valve rotor. A relative rotational displacement between the valve rotor and the valve sleeve is effective to control the delivery to or discharge from a power cylinder of hydraulic fluid. Such a hydraulic rotary valve has a clearance which is commonly referred to as an "underlap" at its neutral position. Such underlap is designated as a clearance 7 in FIG. 4 where an overlapping relationship between an area 3 of a valve rotor 1 where no groove 2 is formed and an area 6 of a valve sleeve 4 where a groove 5 is not formed is avoided, or stated conversely, a fluid passage is defined by an overlapping portion of the groove 2 in the valve rotor 1 and the groove 5 in the valve sleeve 4. In the prior art practice, the magnitude of the underlap 7 has been determined by the width of the groove 2 formed in the valve rotor 1.

Specifically, in the prior art practice, when forming the groove 2 into the valve rotor 1, a milling machine is initially used to cut a groove 8 of a width which is slightly less than the final width of the groove 2, and then the opposite sidewalls 9 of the resulting groove are ground in order to improve the indexing accuracy and the precision of the groove width, thus utilizing two steps. Subsequently, the sidewall 9 of the groove 2 is chamfered as shown at 10 adjacent to the peripheral surface.

The underlap 7 in question is determined by the position of point 11 where the sidewall 9 of the groove 2 intersects with the chamfered portion 10. Because the grinding operation for the sidewall 9 of the groove represents a separate step from the chamfering operation, an error involved with the grinding operation, as indicated by an area shown enclosed by broken lines in FIG. 4, causes the position of the point 11 to change from time to time. As a consequence, when the magnitude of the underlaps 7 located on the opposite sides of the groove 2 are different, this causes a disadvantage that there results an undersirable hydraulic response which is unbalanced in the lateral direction.

SUMMARY OF THE INVENTION

Therefore, it is an object of the invention to provide a method of manufacturing a rotor for hydraulic rotary valve which is free from the laterally unbalanced hydraulic response.

The above object is accomplished in accordance with the invention by forming a chamfered portion of a valve rotor with a bevelled surface which continues to a sidewall of a groove and another surface which joins the bevelled surface with the arcuate peripheral surface, with both these surfaces being simultaneously molded by a plastic working.

DESCRIPTION OF EMBODIMENTS

Figure 1:
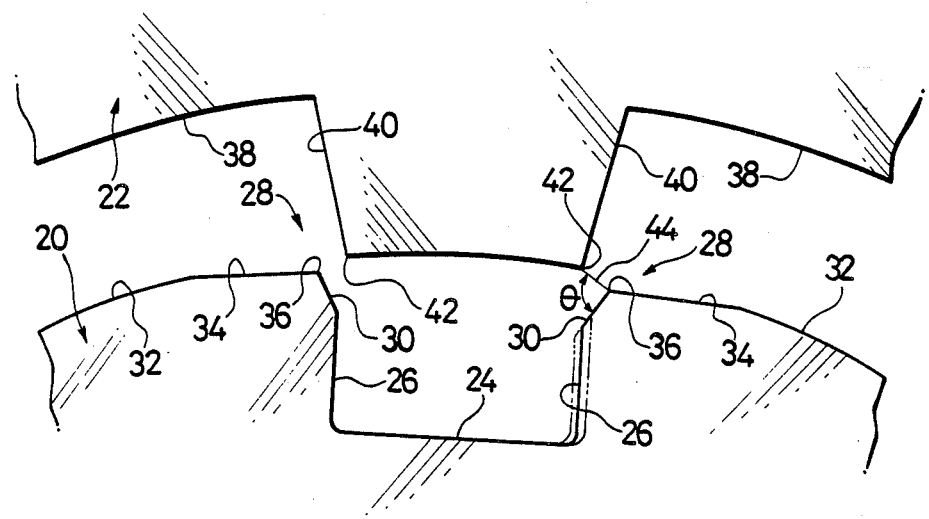
FIG. 1 is a transverse section, taken in a plane perpendicular to the axis, of part of a hydraulic rotary valve including a valve rotor manufactured according to a method according to one embodiment of the invention.

Referring to the drawings, several embodiments of the invention will now be described. FIG. 1 shows a hydraulic rotary valve in its neutral position, the valve comprising a valve rotor 20 manufactured according to the method of the invention and a valve sleeve 22 which is similar to a conventional one. The valve is shown in a transverse plane which is perpendicular to the axis thereof. The valve rotor 20 has a plurality of axially extending grooves 24 formed in its peripheral surface, which are circumferentially spaced apart at an equal interval. Each groove 24 has a pair of sidewalls 26, the upper edge of which is formed with a chamfered portion 28. The chamfered portion 28 comprises a first bevelled surface 30 which is disposed at an angle with respect to the sidewall 26, and a second bevelled surface 34 which joins the first bevelled surface 30 with an arcuate peripheral surface 32 of the valve rotor 20. The first bevelled surface 30 is formed to define an angle $\theta$ greater than 90° with respect to a line 44 which joins the point of intersection 36 between the pair of bevelled surfaces 30, 34 and an edge 42 on a sidewall 40 of a groove 38 formed in the valve sleeve 22. As a result, the underlap or the clearance between the valve rotor 20 and the valve sleeve 22 in the neutral position of the valve is determined by a distance measured between the point of intersection 36 between both of the bevelled surfaces 30, 34 of the valve rotor 20 and the edge or vertex 42 on the sidewall 40 of the groove 38 formed in the valve sleeve 22.

Figure 2:
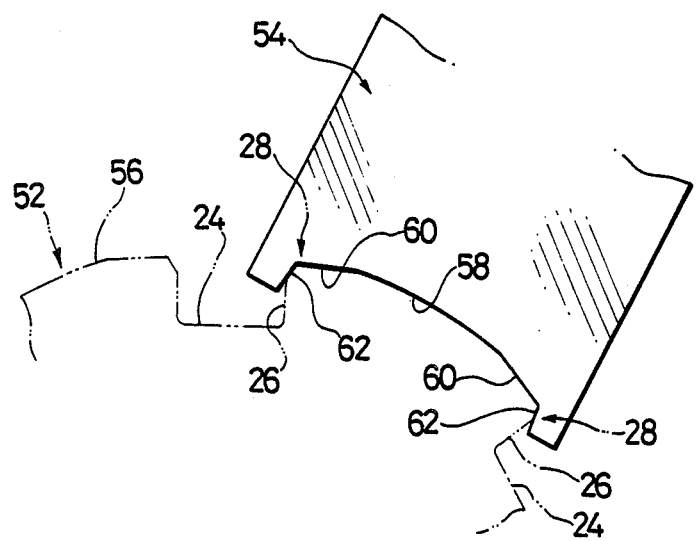
FIG. 2 is an illustration of an implementation of the method of the invention.

The valve rotor 20 which is configured in the manner mentioned above can be molded by applying a press operation utilizing a punch 54 as shown in FIG. 2, to a work 52 in which a plurality of axially extending grooves are previously formed. The punch 54 comprises an arcuate surface 58 which conforms to the arcuate configuration of the peripheral surface 56 of the work 52 and disposed centrally on the front machining surface thereof, a pair of bevelled machining surfaces 60 which are located on the opposite sides of the arcuate surface 58, and another pair of bevelled machining surfaces 62 which are disposed on the opposite sides of the pair of bevelled machining surfaces 60. It will be understood that the both bevelled machining surfaces 60, 62 are configured so as to match the bevelled surfaces 30, 34 which are to be molded on the rotor 20 using the punch 54.

With the method disclosed, the pair of bevelled surfaces 30, 34 which form the chamfered portion 28 are molded simultaneously, so that if the groove width should vary, as indicated by an area enclosed by broken lines in FIG. 1 when forming the groove 24, the point of intersection 36 between both of the bevelled surfaces 30, 34 which determines the magnitude of the underlap remains invariant, thus removing the laterally unbalanced hydraulic response to improve the quality of the valve. In addition, the method of the invention eliminates the need to grind the sidewall 26 of the groove 24, allowing a reduction in the manufacturing cost.

Figure 3:
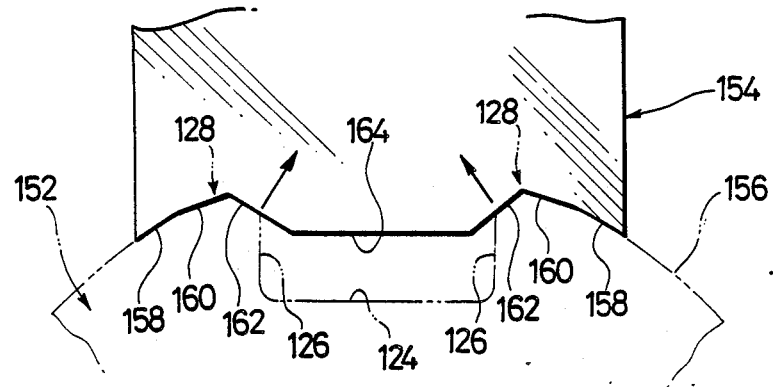
FIG. 3 is a similar illustration of a second embodiment of the invention.
Figure 4:
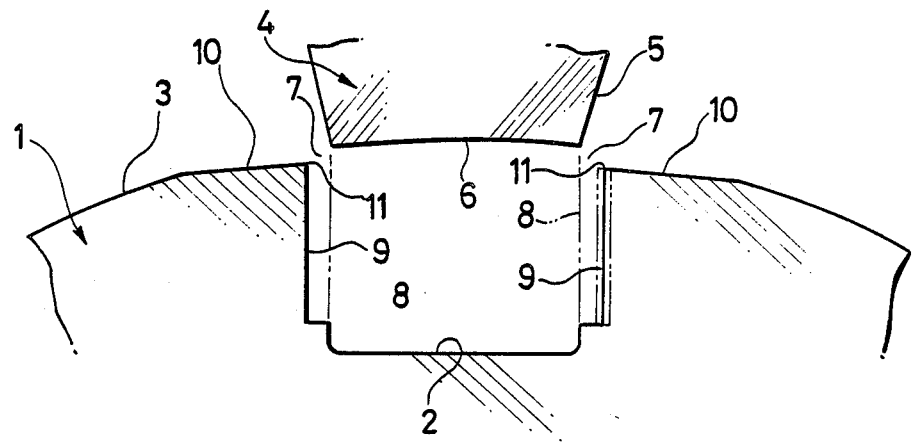
FIG. 4 is a transverse section, taken in a plane perpendicular to the axis, of a hydraulic rotary valve including a valve rotor of the prior art.

FIG. 3 shows a second embodiment of the invention. While in the embodiment mentioned previously, the single punch 54 is used to form the chamfered portions 48 on one sidewall 26 of each of the pair of adjacent grooves 24, in the present embodiment, chamfered portions 128 are simultaneously formed on both of the sidewalls 126 of a single groove 124, using a single punch 154. The punch 154 used in this embodiment comprises a pair of arcuate surfaces 158 which conform to the arcuate configuration of the peripheral surface 156 of a work 152 and disposed on both of the lateral ends, a pair of bevelled machining surfaces 160 and another pair of bevelled machining surfaces 162, which are disposed successively inside and between the pair of arcuate surfaces 158, with an area located between the pair of bevelled machining surfaces 162 representing a flat surface 164. However, the flat surface 164 may be configured otherwise, provided it does not interfere with the bottom surface of the groove 124. When using the punch 154, a reaction will be developed in a direction indicated by arrows, which effectively avoids any strength problem and improves the durability of the punch 154 as compared with the previous embodiment.

It should be understood that the method of the invention is not limited to the use of the punches 54, 154 which are configured in the manner mentioned above, but that any tool may be used which is capable of simultaneously molding the pair of bevelled surfaces 30, 34 by a plastic working in the manner mentioned above.

While the invention has been shown and described above in connection with several embodiments thereof, it should be understood that other changes and modifications will readily occur to one skilled in the art without departing from the spirit and scope of the invention defined by the appended claims.

What is claimed is:

1. A method of manufacturing a valve rotor having a plurality of axially extending grooves formed in its peripheral surface, each axially extending groove having opposite sidewalls, the edges of which are formed with chamfered portions, said valve rotor defining a hydraulic rotary valve together with a valve sleeve which is fitted around said valve rotor; the method comprising forming each of said chamfered portions with a first surface which is contiguous with the sidewall of a groove and which is disposed at an angle with respect to said sidewall, and a second surface which is joined to said first surface and an arcuate peripheral surface on said valve rotor, said first and second surfaces being simultaneously molded by a plastic working, and forming said first and second surfaces so that a line, viewed in a plane perpendicular to an axis of said valve rotor and said valve sleeve, which joins a point of intersection between said first and second surfaces and a vertex on a mutually adjacent sidewall of a groove formed in said valve sleeve, defines an angle greater than 90° with respect to a line constituting the cross-sectional representation of said first surface.

2. A method of manufacturing a valve rotor according to claim 1 in which the chamfered portions is are formed by a press operation.

3. A method of manufacturing a valve rotor according to claim 2 in which a single punch is used to simultaneously form said chamfered portions on one sidewall of each of a pair of adjacent grooves.

4. A method of manufacturing a valve rotor according to claim 3 in which a front machining surface of said punch includes an arcuate surface which conforms to said arcuate peripheral surface of said valve rotor and disposed centrally on said front machining surface, a pair of first bevelled surfaces which are disposed on the opposite sides of said arcuate surface, and another pair of bevelled surfaces which are disposed outside and on the opposite sides of said first bevelled surfaces.

5. A method of manufacturing a valve rotor according to claim 2 in which a single punch is used to simultaneously form chamfered portions on both of the sidewalls of a single groove.

6. A method of manufacturing a valve rotor according to claim 5 in which a front machining surface of said punch includes a pair of arcuate surfaces, which conform to said arcuate peripheral surface of said valve rotor and disposed on both of the lateral ends of said front machining surface, and a pair of first bevelled surfaces and another pair of second bevelled surfaces which are successively disposed inside said arcuate surfaces.

* * * * *